Patented Dec. 1, 1931

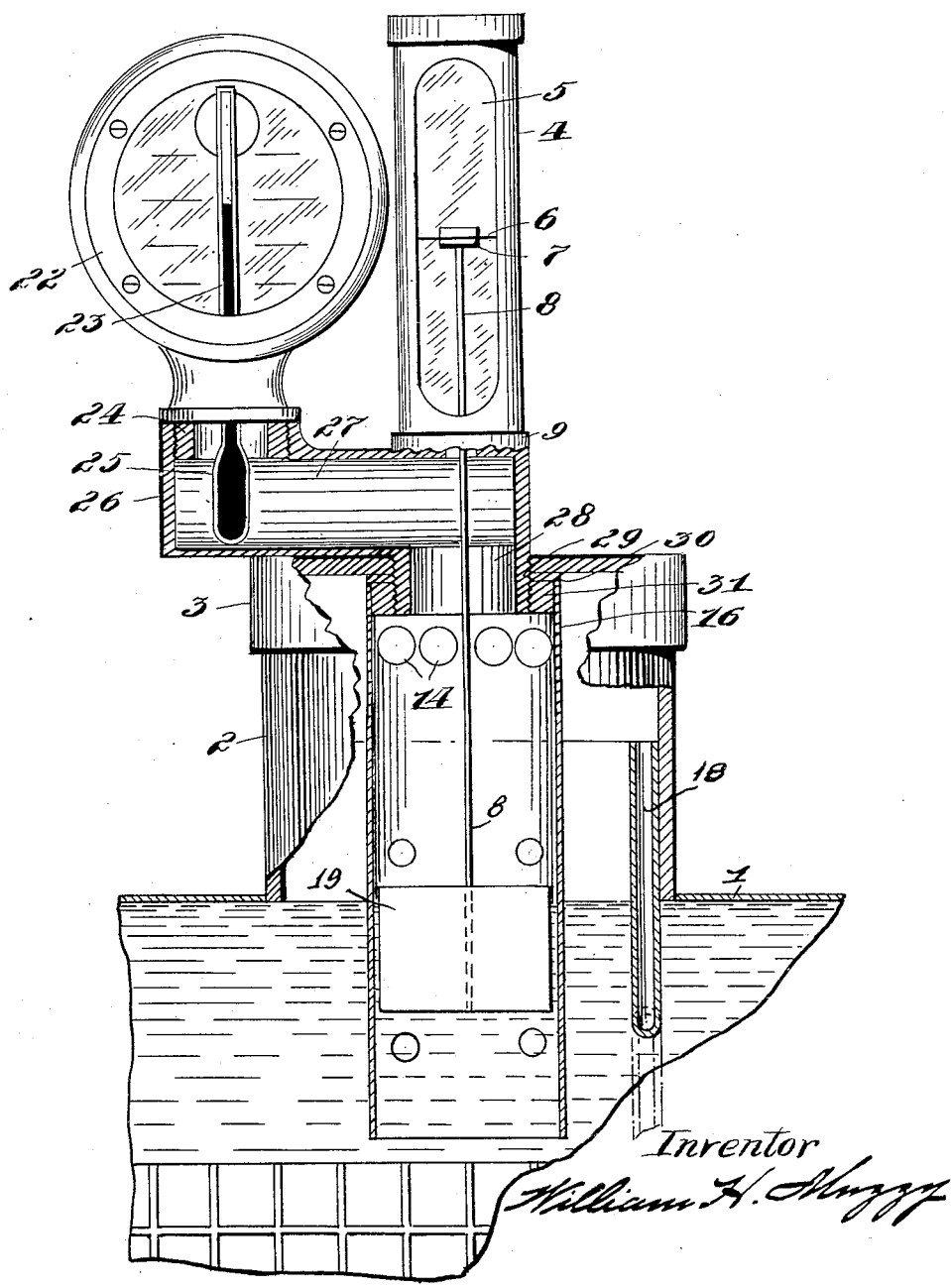

1,834,797

UNITED STATES PATENT OFFICE

WILLIAM H. MUZZY, OF EVANSTON, ILLINOIS, ASSIGNOR, BY MESNE ASSIGNMENTS, TO MOTOMETER GAUGE & EQUIPMENT CORPORATION, OF LONG ISLAND CITY, NEW YORK, A CORPORATION OF DELAWARE

OVERFLOW AND STEAM INDICATOR FOR AUTOMOBILES

Application filed January 28, 1922. Serial No. 532,368.

This invention relates to improvements in automobile radiator attachments, and has for its primary object the provision of a device for indicating dangerous motor operating conditions.

More particularly it is an object of the invention to provide means for indicating to the driver that steam or vapor is forming in the cooling system of the motor.

A further object of the invention is to provide a combined overflow and water level indicator for the radiator, and vapor, steam or overheating danger indicator.

In the accompanying drawing forming a part of this specification, the figure represents a detail, front elevation, partly broken away, of a structure embodying the invention applied to the radiator of a motor vehicle.

It is a well known fact that the temperature at which the cooling liquid in a motor vehicle cooling system boils is variable, due to changes of altitude and to the introduction of freezing point lowering compound into the cooling water. The boiling away of the cooling liquid is dangerous since it reduces the proportion of freezing point lowering compound and also exposes the motor to overheating. Consequently, it is desirable to provide warning means having a conspicuous, significant, characteristic action for definitely informing the driver when boiling occurs, regardless of the temperature at which boiling occurs. The present invention aims to provide such an indicator means.

It is also known that steam is sometimes formed around the cylinders sufficient to cause surging of the cooling liquid with consequent overflowing and wasting of the freezing point lowering compound when the heating is not sufficient to cause boiling throughout the system accompanied by the generation of steam in large quantities. Likewise, wasteful overflowing is frequently caused by stopping the vehicle too suddenly. The present invention seeks to provide means for notifying the operator when such conditions occur, so that he may be influenced by such notification to operate the vehicle and the motor in such manner that overflowing is avoided.

The figure of the drawing is a front elevation showing an instrument embodying the invention applied to the radiator of a motor vehicle, parts being broken away for clearness of illustration.

In the illustrative form of the invention, a cap 3 is mounted upon the neck 2 of a motor vehicle radiator 1, and carries indicators for accomplishing the above stated objects.

The cap 3 may be of any usual construction and is formed with an aperture through which a bored, downward extension 29 of the instrument body extends. The instrument includes a float indicator and a temperature indicator.

The indicating part of the float indicator comprises a casing 4 secured in a cupped portion 9 of the instrument body, said casing being provided with elongated openings in its front and back sides, and being formed to snugly fit and enclose a sight tube 5. An indicator head 7 is carried by a stem 8 within the sight tube to stand at the level of an index marked 6 on the tube when the water level in the radiator is normal. The stem 8 extends downward through a bore 28 in the instrument body and is connected at its lower end to an actuating float 19 which is buoyed by the water in the radiator. A protective perforated shell 16 surrounds the float and is secured to an exteriorly threaded downward projection 29 of the instrument body by means of an internally threaded collar 31. A washer 30 may be interposed between the collar 31 and the cap 3 to seal the joint between the instrument and the cap.

The instrument body is provided with a lateral extension or arm 26 having a horizontal bore 27 therethrough in communication with the vertical bore 28. This horizontal bore 27 defines a chamber entirely outside the radiator, and as the body of the instrument is exposed fully to the atmosphere, the temperature of the chamber or bore 27 is not substantially affected by the temperature of the motor under normal operating conditions. The body of the instrument has an internally threaded, upwardly directed opening at the outer end of the extension 26 in which a temperature responsive indicator of well known form comprising a thermometer tube 23, frame 22 and threaded stem 24 may be mounted to locate the thermometer bulb in the chamber 27.

In the operation of the vehicle the indicator 7 of the float device normally stands in an approximately uniform position dependent on the level of the water in the radiator, and serves to indicate to the operator whether or not the cooling system is adequately filled. Should the water be caused for any reason to surge forward so as to overflow through the usual overflow pipe 18 of the radiator, the float indicator will be raised by the rising level of the water to the top of the sight tube 5. As such overflowing may be caused by conditions which the operator is able to correct or avoid, such as running with the radiator shutter closed or stopping the vehicle too suddenly, the indication is useful to avoid wasting of the cooling water with its content of freezing point lowering compound.

Should the motor operating conditions become such that general overheating occurs in spite of the cooling system, steam will be generated in such quantities that it will be caused to collect in the radiator neck and to pass upward into the chamber 27, so that the thermometer bulb will be quickly heated. As the thermometer bulb is normally exposed to a temperature very little above atmospheric temperature, the entrance of steam into the chamber 27 will result in a sudden rise of the thermometer liquid from a point on the tube 23 corresponding substantially to atmospheric temperature to a point corresponding to the boiling point of the cooling water or solution. This action will occur regardless of the temperature at which boiling occurs, and the sudden and extensive rise of the liquid will constitute a conspicuous and unmistakable indication of danger.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

A warning instrument for a vehicle motor, having a water cooling system including a radiator, said instrument comprising a body attachable to the cap of the radiator and provided with a vertical passage, float indicator mechanism including a float, an indicator and a stem connecting the float and the indicator and extending through the vertical passage of the body, a lateral projection on the body exterior of the radiator, having a chamber communicating with the vertical passage and through said vertical passage with the interior of the radiator, and a heat operated indicator comprising a temperature responsive element mounted in the chamber.

In testimony whereof I affix my signature.

WILLIAM H. MUZZY.